United States Patent
Kamikawa et al.

(10) Patent No.: US 11,428,271 B2
(45) Date of Patent: Aug. 30, 2022

(54) ROTATIONAL DRIVING FORCE TRANSMISSION MECHANISM

(71) Applicant: HONDA MOTOR CO., LTD., Tokyo (JP)

(72) Inventors: Mitsuru Kamikawa, Tokyo (JP); Taisuke Sakakibara, Tokyo (JP); Junichi Suto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 969 days.

(21) Appl. No.: 16/132,649

(22) Filed: Sep. 17, 2018

(65) Prior Publication Data
US 2019/0085891 A1 Mar. 21, 2019

(30) Foreign Application Priority Data
Sep. 19, 2017 (JP) .............................. JP2017-178815

(51) Int. Cl.
| | |
|---|---|
| F16C 3/02 | (2006.01) |
| F16D 1/068 | (2006.01) |
| F16D 3/223 | (2011.01) |
| F16D 1/08 | (2006.01) |
| F16D 3/205 | (2006.01) |

(52) U.S. Cl.
CPC .............. *F16D 1/068* (2013.01); *F16C 3/026* (2013.01); *F16D 1/0858* (2013.01); *F16D 3/2055* (2013.01); *F16D 3/223* (2013.01); *F16C 2226/40* (2013.01); *F16C 2226/80* (2013.01); *F16C 2326/06* (2013.01); *F16D 2003/22313* (2013.01)

(58) Field of Classification Search
CPC .. F16C 3/026; F16C 2226/80; F16C 2326/06; F16D 3/2055; F16D 3/223; F16D 2003/22313; F16D 2003/22323; F16D 1/068
USPC ........................................................ 464/182
See application file for complete search history.

(56) References Cited

U.S. PATENT DOCUMENTS 3,540,232 A * 11/1970 Breuer .................... F16D 3/227
464/146
5,851,152 A * 12/1998 Ilzhofer .................... F16D 1/06
464/181

FOREIGN PATENT DOCUMENTS

| JP | 05-215119 | 8/1993 | |
|---|---|---|---|
| JP | H05215119 A * | 8/1993 | ............. F16C 3/026 |
| KR | 200162479 Y1 * | 12/1999 | |

(Continued)

*Primary Examiner* — Amber R Anderson
*Assistant Examiner* — David M Griffin
(74) *Attorney, Agent, or Firm* — Amin, Turocy & Watson, LLP

(57) ABSTRACT

A rotational driving force transmission mechanism includes a cylindrical shaft made of fiber reinforced plastic, and a first constant velocity joint. The shaft is joined to the first constant velocity joint via a metallic intervening member which is attached to one end of the shaft in the axial direction. The intervening member includes a shaft portion and a main body portion. The shaft portion is inserted into the one end of the shaft from a distal end side thereof. The main body portion is of a bottomed tubular shape made up from a bottom part joined to a proximal end side of the shaft portion, and a tubular portion fitted over the one end of the shaft. The first constant velocity joint includes an inner ring fitted externally over the tubular portion of the intervening member.

7 Claims, 4 Drawing Sheets

(56) References Cited

FOREIGN PATENT DOCUMENTS

KR       200165819  Y1  *   1/2000

* cited by examiner

ROTATIONAL DRIVING FORCE TRANSMISSION MECHANISM

CROSS-REFERENCE TO RELATED APPLICATION

This application is based upon and claims the benefit of priority from Japanese Patent Application No. 2017-178815 filed on Sep. 19, 2017, the contents of which are incorporated herein by reference.

BACKGROUND OF THE INVENTION

Field of the Invention

The present invention relates to a rotational driving force transmission mechanism having a constant velocity joint and a cylindrical shaft made of fiber reinforced plastic.

Description of the Related Art

For example, in an engine-type or electrically driven type of vehicle, power (rotational torque) from an engine or an electric motor is transmitted to the drive wheels via a rotational driving force transmission mechanism disposed between a speed reduction device and the drive wheels. Such a rotational driving force transmission mechanism generally is equipped with constant velocity joints arranged at an interval in two locations in the axial direction, and a shaft connecting the constant velocity joints to transmit torque therebetween. In order to suitably transmit the aforementioned torque, it is necessary to construct the shaft from a material that is superior in terms of torsional strength and fatigue strength. Carbon steel or the like, the hardness of which is increased by high frequency induction hardening, is generally used as a material for such a shaft.

Incidentally, attempts to reduce the weight of automobiles have been made in recent years for the purpose of reducing fuel consumption and the like. From this standpoint, in the case of reducing the weight of the shaft, there may be carried out a reduction in diameter of the shaft, or providing a so-called lightening portion thereon, within a range in which sufficient torsional strength and fatigue strength can be maintained. However, there is a limit to the weight that is capable of being reduced by such methods.

Thus, in order to effectively reduce the weight of the shaft, there can be cited, for example, a technique of using fiber reinforced plastic (FRP), which is lighter than carbon steel, as a material for the shaft. In this case, both end portions of the shaft must be formed with shapes that enable attachment of constant velocity joints thereto, and if the shaft is made of FRP, there is a concern that sufficient machining accuracy cannot be obtained. On the other hand, the central part of the shaft has fewer restrictions on the shape thereof as described above. Accordingly, it may be considered to constitute both end portions of the shaft from metal members such as carbon steel, whereas the central portion of the shaft is constituted from a member made of FRP. In order to obtain a drive shaft of this type, it is necessary to join the metal members and the FRP member.

In general, as a method for firmly joining a metal member to an FRP member, mechanical joining such as riveting or the like is known. Further, for example, in Japanese Laid-Open Patent Publication No. 05-215119, a method is proposed of joining end portions of a cylindrical metallic member and an FRP member with an adhesive in order to manufacture a propeller shaft.

SUMMARY OF THE INVENTION

As described above, using a method of mechanically joining a metal member and an FRP member, since it is necessary to pierce the metal member and the FRP member in order to insert rivets or the like therein, the reinforcing fibers in the FRP member may become damaged and severed portions may occur therein. In this case, since the strength of the FRP member decreases, there is a concern that adequate torsional strength and fatigue strength cannot be obtained. Further, an increase in the number of parts, and an increase in weight due to the increased number of parts are inevitable. In addition, so as to enable insertion of the rivets therein, it is necessary to increase the thickness of the metal member or the FRP member, and the weight corresponding to such thickening also increases.

As with the joining method disclosed in Japanese Laid-Open Patent Publication No. 05-215119, in the case of being joined only with an adhesive, the bonding strength between the metal member and the FRP member tends to be insufficient. Accordingly, by such a joining method, it is difficult to obtain a drive shaft equipped with sufficient torsional strength and fatigue strength.

A principal object of the present invention is to provide a rotational driving force transmission mechanism having sufficient torsional strength and fatigue strength, and which can achieve an effective reduction in weight.

According to an aspect of the present invention, a rotational driving force transmission mechanism is provided, including a cylindrical shaft made of fiber reinforced plastic, and a constant velocity joint, wherein the shaft is joined to the constant velocity joint via a metallic intervening member which is attached to at least one end of the shaft in an axial direction of the shaft, the intervening member includes a shaft portion configured to be inserted into the one end of the shaft from a distal end side thereof, and a main body portion of a bottomed tubular shape, made up from a bottom part joined to a proximal end side of the shaft portion, and a tubular portion configured to be fitted externally over the one end of the shaft, and the constant velocity joint includes an annular member fitted externally over the tubular portion of the intervening member.

Since the rotational driving force transmission mechanism contains the shaft made of fiber reinforced plastic (FRP), which is lighter than metal, it is possible to effectively reduce the weight in comparison with a case in which the rotational driving force transmission mechanism is equipped with a metal shaft.

Further, the intervening member is attached to at least one end (hereinafter also referred to simply as an end) of the shaft in the axial direction. The annular member of the constant velocity joint is externally fitted over the tubular portion of the intervening member, whereby the constant velocity joint and the shaft are joined via the intervening member. Since the intervening member is made of metal, which is superior in terms of the ability to perform machining thereon, the tubular portion can be easily and highly accurately machined to have a shape that can be firmly joined to the annular member.

In addition, in this case, it is possible to join the constant velocity joint to the tubular portion of the intervening member utilizing, for example, existing equipment or the like for joining a constant velocity joint to a solid shaft made of metal. Accordingly, it is also possible to suppress equipment costs for obtaining the rotational driving force transmission mechanism.

Furthermore, it is possible to firmly join the shaft, which is made of FRP, and the intervening member, which is made of metal. As described above, in the intervening member, the shaft portion thereof is inserted into the shaft, and the tubular portion is fitted over the shaft. Stated otherwise, the shaft portion and the tubular portion make it possible for the shaft to be sandwiched from both the inner side and the outer side thereof in the radial direction. Consequently, the shaft and the intervening member can be firmly joined together. Further, since the annular member of the constant velocity joint is externally fitted over the tubular portion, the state in which the shaft is sandwiched between the tubular portion and the shaft portion can be suitably maintained.

As a result, the bonding strength between the shaft and the intervening member can be significantly increased, for example, more so than the bonding strength provided only by an adhesive. Further, unlike mechanical joining, it is possible to avoid the occurrence of damaged or severed portions in the reinforcing fibers of the shaft, and it is possible to prevent the weight of rivets or the like from being added, and to avoid increasing the thickness of the shaft and the intervening member.

As described above, according to the rotational driving force transmission mechanism, it is possible to effectively reduce the weight thereof, while maintaining the torsional strength and the fatigue strength, which are sufficiently large for transmission of torque.

In the above-described rotational driving force transmission mechanism, protrusions extending along the axial direction of the shaft portion are preferably disposed in plurality on an outer circumference of the shaft portion at intervals in the circumferential direction of the shaft portion, whereby ridges and valleys are arranged alternately in the circumferential direction, and on the shaft portion, an outer diameter of the ridges preferably is greater than an inner diameter of the shaft, and an outer diameter of the valleys preferably is less than the inner diameter of the shaft. In this case, since the ridges enter into the shaft from the inner circumferential surface toward the outer circumferential side thereof, the shaft and the shaft portion can be joined together more firmly.

In the above-described rotational driving force transmission mechanism, an adhesive layer preferably is disposed between an outer circumferential surface of the shaft portion and an inner circumferential surface of the shaft. In this case, it is possible to more firmly join the shaft and the shaft portion together via the adhesive layer.

In the above-described rotational driving force transmission mechanism, an adhesive layer preferably is disposed between an outer circumferential surface of the shaft and an inner circumferential surface of the tubular portion. In this case, it is possible to more firmly join the shaft and the tubular portion together via the adhesive layer.

In the above-described rotational driving force transmission mechanism, serrations configured to be fitted mutually together preferably are formed on an outer circumference of the tubular portion and an inner circumference of the annular member. In this case, it is possible to join the tubular portion and the annular member more firmly by way of serration-fitting.

In the above-described rotational driving force transmission mechanism, the tubular portion preferably is press-fitted into the annular member. In this case, a state in which the tubular portion is pressed toward the shaft can be more suitably maintained by the annular member. As a result, the shaft can be more firmly sandwiched between the tubular portion and the shaft portion, and it is possible to stably increase the bonding strength between the annular member and the tubular portion, as well as the bonding strength between the tubular portion and the shaft portion.

In the above-described rotational driving force transmission mechanism, the tubular portion preferably is thicker on a side of an opening than on a side of the bottom part. In this case, it is possible to increase the pressing force applied to the shaft from the side of the opening of the tubular portion that is inserted inside the annular member. On the other hand, since the bottom side of the tubular portion is thinner than at the side of the opening, it is possible to easily insert the tubular portion into the annular member. Accordingly, it is possible to suitably enhance the bonding strength between the constant velocity joint and the shaft via the intervening member, without impairing the ability to assemble the rotational driving force transmission mechanism.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a rotational driving force transmission mechanism according to the present invention will be presented and described in detail below with reference to the accompanying drawings.

Figure 1:
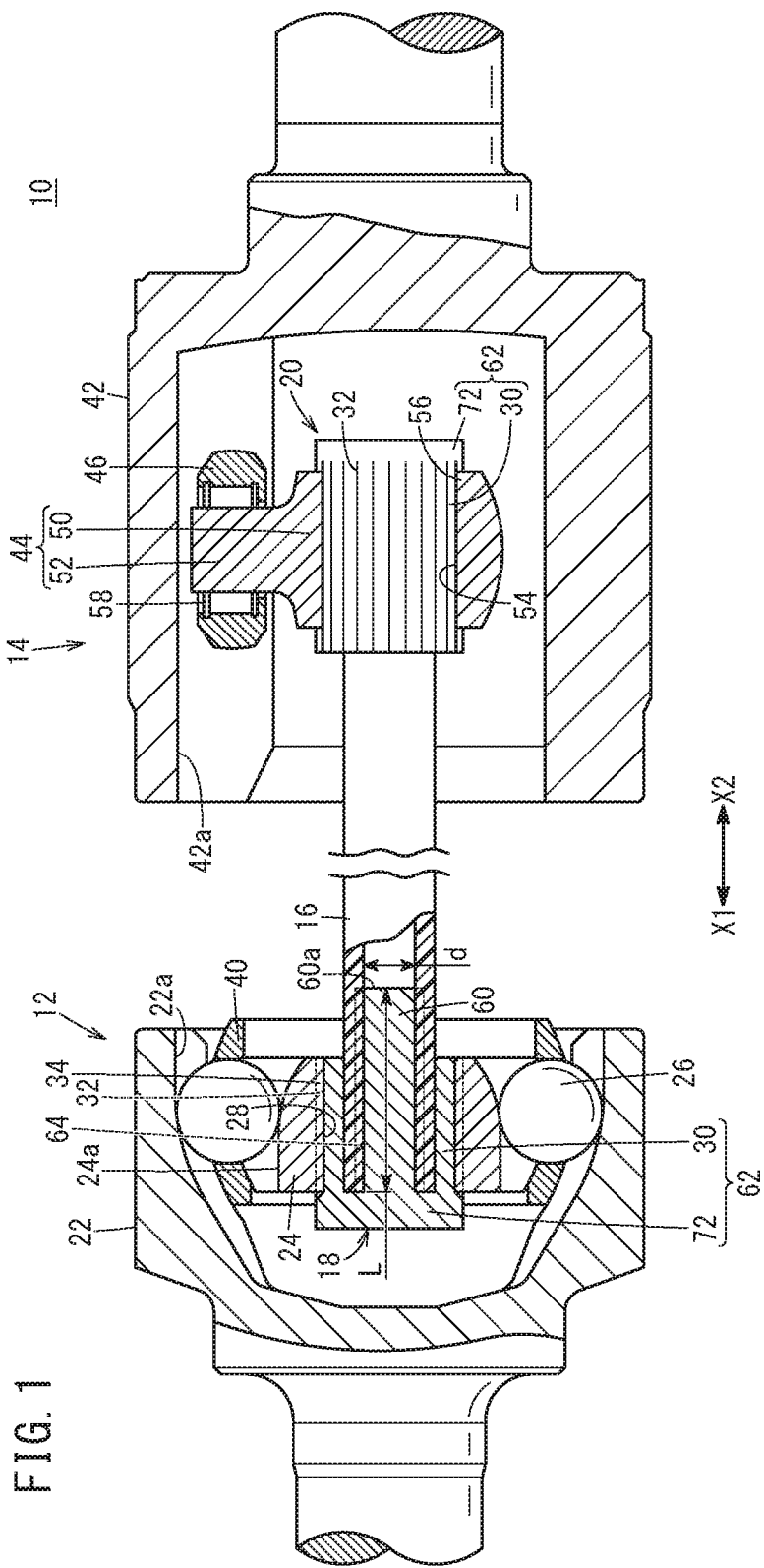
FIG. 1 is a schematic cross-sectional view of principal components of a rotational driving force transmission mechanism according to an embodiment of the present invention.

As shown in FIG. 1, the rotational driving force transmission mechanism 10 according to the present embodiment is equipped with a first constant velocity joint 12, a second constant velocity joint 14, a shaft 16, an intervening member 18 attached to an end of the shaft 16 on one end side (the side of the arrow X1 in FIG. 1) in an axial direction thereof, and an intervening member 20 attached to an end thereof on another end side (the side of the arrow X2 in FIG. 1). The intervening member 18 and the intervening member 20 can be constructed substantially in the same manner as each other, except for being attached to the one end of the shaft 16 or attached to the other end of the shaft 16. Therefore, mutually corresponding constituent elements of the intervening members 18, 20 are denoted with the same reference numerals, and will be described in common.

The first constant velocity joint 12 is a Birfield type constant velocity joint interposed between an outboard side, i.e., one end side, of the shaft 16 and a hub (not shown), and is basically constituted from an outer cup 22, an inner ring 24 (annular member), and balls 26. The outer cup 22 includes a cup shaped portion and is integrally connected to the hub. On an inner surface of the outer cup 22, which is formed by a spherical surface, for example, six first ball grooves 22a are formed to extend along the axial direction and at equal intervals, respectively, about a central axis.

The inner ring 24 is of an annular shape in which a plurality of second ball grooves 24a are provided on an outer circumferential wall so as to correspond to the aforementioned first ball grooves 22a, and is accommodated inside the outer cup 22. Further, in the inner ring 24, on the inner circumference of a hole portion 28 that is formed in the center thereof, serrations 34 are provided, which are fitted with serrations 32 provided on the outer circumference of a tubular portion 30 of the intervening member 18, as will be described later.

The balls 26 are rollably disposed in respective cavities between the first ball grooves 22a and the second ball grooves 24a which face each other, and are retained in a retainer 40 that is interposed between an inner surface of the outer cup 22 and an outer surface of the inner ring 24. The balls 26 contact the first ball grooves 22a and the second ball grooves 24a, thereby carrying out transmission of torque between the outer cup 22 and the inner ring 24.

A joint boot (not shown), which is made of rubber or resin and has a bellows portion, is installed between the outer cup 22 and the shaft 16, and a grease composition serving as a lubricant is sealed inside the joint boot.

The second constant velocity joint 14 is a tripod type constant velocity joint interposed between an inboard side, i.e., another end side, of the shaft 16 and a differential gear (not shown), and is basically constituted from an outer ring member 42, a spider 44 (annular member), and rollers 46.

The outer ring member 42 includes a cup shaped portion and is integrally connected to the differential gear. For example, three track grooves 42a are formed on an inner surface of the outer ring member 42 at equal intervals about the central axis.

The spider 44 has an annular portion 50 and a plurality of trunnions 52 that project out from an outer circumferential wall of the annular portion 50. The spider 44 is inserted into the outer ring member 42, in a manner so that the trunnions 52 are accommodated respectively in the track grooves 42a. Further, in the annular portion 50, on the inner circumference of a hole portion 54 that is formed in the center thereof, serrations 56 are provided, which are fitted with the serrations 32 provided on the outer circumference of the tubular portion 30 of the intervening member 20, as will be described later.

The rollers 46 are formed in an annular shape and are rotatably fitted onto the trunnions 52 via a plurality of rolling bodies 58, and are in sliding contact with inner walls of the track grooves 42a. Stated otherwise, inner circumferential walls of the rollers 46 contact outer walls of the trunnions 52, and the outer circumferential walls of the rollers 46 contact the inner walls of the track grooves 42a, thereby carrying out transmission of torque via the rollers 46 between the outer ring member 42 and the spider 44. The rolling bodies 58 may be, for example, rolling bearings including needles, rollers, or the like.

A joint boot (not shown), which is similar to the aforementioned joint boot, is also installed between the outer ring member 42 and the shaft 16.

As described above, the inner ring 24 of the first constant velocity joint 12 is externally fitted onto the intervening member 18 attached to the one end of the shaft 16, and the spider 44 of the second constant velocity joint 14 is externally fitted onto the intervening member 20 that is attached to the other end of the shaft 16. Therefore, for example, the torque transmitted from the outer ring member 42 to the spider 44 is transmitted from the inner ring 24 to the outer cup 22 via the intervening member 20, the shaft 16, and the intervening member 18. More specifically, the shaft 16 and the intervening members 18, 20, which are integrally constructed, connect the first constant velocity joint 12 and the second constant velocity joint 14, and transmit torque therebetween.

The shaft 16 is of a cylindrical shape and made of fiber reinforced plastic (FRP), and is formed by laminating a plurality of prepreg sheets (none of which are shown), for example, the prepreg sheets being formed by impregnating the reinforcing fibers with a matrix resin. As an example of such a case, there may be cited a case in which 40 to 50 prepreg sheets are laminated to thereby obtain the shaft 16 having a thickness of approximately 5 mm. Preferably, the shaft 16 is formed in a manner so that the tensile elastic modulus thereof is greater than or equal to 230 GPa, and the tensile strength is greater than or equal to 3,500 MPa.

The type of reinforcing fibers and the type of matrix resin are not particularly limited, however, from the standpoint of weight reduction and high structural integrity of the shaft 16, carbon fibers preferably are used as the reinforcing fibers. More specifically, the fiber reinforced plastic is preferably a carbon fiber reinforced plastic (CFRP). Further, the matrix resin may be either a thermoplastic resin or a thermosetting resin.

Hereinafter, concerning the detailed configuration of the intervening members 18, 20, a description will be presented of the intervening member 18, whereas description of the intervening member 20 is omitted. As shown in FIG. 1, the intervening member 18 includes a shaft portion 60 that is inserted into the interior (hollow interior) of the shaft 16 from a distal end 60a side thereof, and a main body portion 62 having a bottomed tubular shape. In the case that the insertion length of the shaft portion 60 with respect to the shaft 16 is given by L, and the inner diameter of the shaft 16 is given by d, preferably, between such variables, the relationship $1.25d \leq L \leq 2.00d$ is satisfied. Owing to this feature, it is possible to realize an appropriate balance between enhancing the bonding strength between the shaft portion 60 and the shaft 16, and suppressing an increase in the weight of the shaft portion 60.

Figure 2:
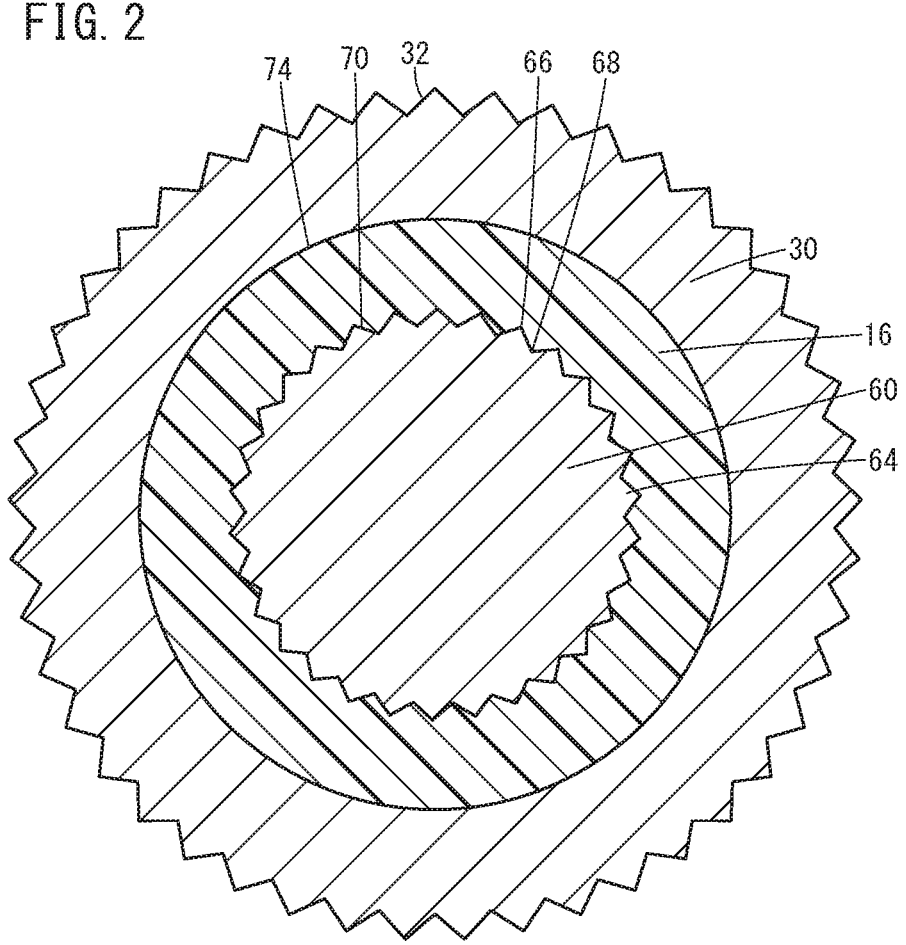
FIG. 2 is a cross-sectional view of principal parts perpendicular to the axial direction of an intervening member and a shaft.
Figure 3:
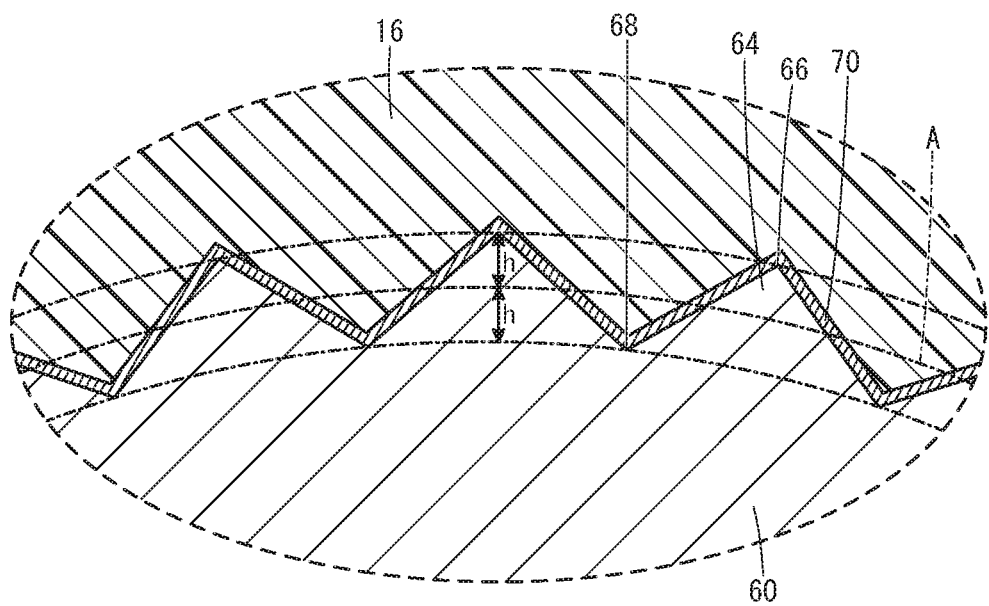
FIG. 3 is an enlarged view of principal parts of protrusions and the shaft shown in FIG. 2.

As shown in FIGS. 2 and 3, on the outer circumference of the shaft portion 60, a plurality of protrusions 64, which extend along the axial direction of the shaft portion 60, are provided at intervals in the circumferential direction of the shaft portion 60. Consequently, ridges 66 and valleys 68 are arranged alternately in the circumferential direction of the shaft portion 60. According to the present embodiment, the cross-sectional shape of the protrusions 64 perpendicular to the axial direction is substantially triangular.

On the shaft portion 60, the outer diameter of the ridges 66 is set to be greater than the inner diameter d of the shaft 16, and the outer diameter of the valleys 68 is set to be less than the inner diameter d of the shaft 16. In accordance with this feature, the ridges 66 enter into the wall of the shaft 16 from the inner circumferential surface toward the outer circumferential side of the shaft 16, and therefore, the shaft portion 60 and the shaft 16 can be firmly joined together. Further, an adhesive layer 70 preferably is interposed between the outer circumferential surface of the shaft portion 60 and the inner circumferential surface of the shaft 16. Consequently, the bonding strength between the shaft portion 60 and the shaft 16 can be increased.

In this instance, it is preferable for the inner diameter d of the shaft 16 prior to insertion of the shaft portion 60 to be in the position indicated by the one-dot dashed line A in FIG. 3. When the shaft portion 60 is inserted into the shaft 16, accompanied by vertex sides of the ridges 66 entering into the wall of the shaft 16, the physical substance of the shaft 16 moves into the valleys 68, and the shaft 16 and the adhesive layer 70 is packed or filled into the valleys 68. As discussed above, when the shaft portion 60 is inserted into the shaft 16, the vertex sides of the ridges 66 of a height h corresponding to one half the projecting height 2h of the ridges 66 enters into the wall of the shaft 16. The height h is preferably set so as to correspond to a thickness of two to four sheets (for example, from 0.1 to 0.5 mm) of the laminated prepreg sheets that make up the shaft 16. Consequently, by suitably advancing the ridges 66 into the wall of the shaft 16 while avoiding damage to the interlayers of the laminated prepreg sheets, it is possible to suitably improve the bonding strength between the shaft portion 60 and the shaft 16.

Insofar as it is a metal, the material of the shaft portion 60 is not particularly limited, however, a material is preferably used which is obtained by subjecting carbon steel, such as S50C or the like according to the JIS industrial standard, to a heat treatment such as high frequency induction hardening. In this case, the surface hardness of the shaft portion 60 is preferably greater than or equal to 55, and more preferably, is 58 to 62 in Rockwell hardness HRC. In this case, when the shaft portion 60 is inserted into the shaft 16, the ridges 66 can easily be introduced into the wall of the shaft 16, and it is possible to effectively suppress any dimensional changes when the aforementioned heat treatment is carried out.

Figure 4:
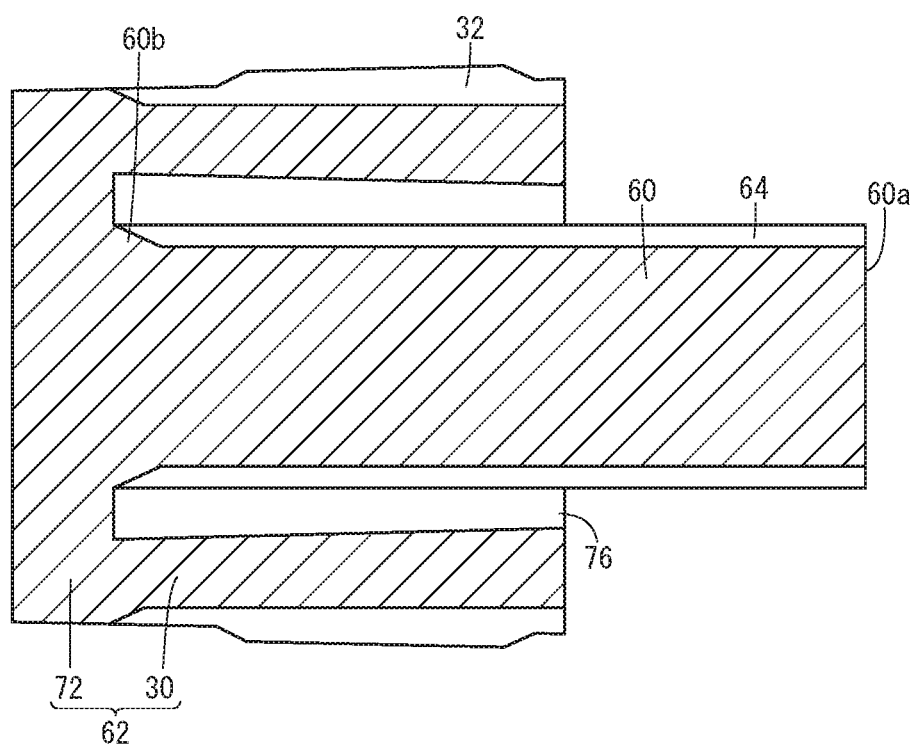
FIG. 4 is a cross-sectional view taken along an axial direction of the intervening member.

As shown in FIGS. 1 and 4, the main body portion 62 includes a bottom part 72 joined to a proximal end 60b side of the shaft portion 60, and the tubular portion 30 that is fitted over the one end of the shaft 16. The bottom part 72 is in the shape of a disk having a larger diameter than the outer diameter of the shaft 16. The proximal end 60b of the shaft portion 60 is joined to a substantially central portion of the bottom part 72 in a radial direction thereof using, for example, a non-illustrated screw or the like. Further, the tubular portion 30 extends from an outer circumferential edge of the bottom part 72 toward the distal end 60a side of the shaft portion 60, so as to be coaxial with the shaft portion 60. Therefore, the inner circumferential surface of the tubular portion 30 is arranged with a space in the radial direction from the outer circumferential surface of the shaft portion 60, and the shaft 16 is press-fitted therein. An adhesive layer 74 (see FIG. 2) is preferably provided between the inner circumferential surface of the tubular portion 30 and the shaft 16. In accordance with this feature, it becomes possible to more firmly join the shaft 16 and the tubular portion 30.

The tubular portion 30 is press-fitted into the hole portion 28 of the inner ring 24, whereby the pressed state of the tubular portion 30 toward the shaft 16 is maintained. As shown in FIG. 4, the tubular portion 30 is slightly thicker on the side of the opening 76 than on the side of the bottom part 72. Therefore, in particular, the pressing force applied to the shaft 16 at the side of the opening 76 is increased. Further, as discussed above, the serrations 32 which are fitted with the serrations 34 of the hole portion 28 are formed on the outer circumference of the tubular portion 30.

Insofar as it is a metal, the material of the main body portion 62 is not particularly limited. For example, a material is preferably used which is obtained by subjecting a case hardened steel, such as SCr420 or the like according to the JIS industrial standard, to a heat treatment such as carburizing quenching and tempering or the like, and which has a Rockwell hardness HRC of 55 or greater. Further, with the main body portion 62, it is preferable to set the Rockwell hardness HRC to lie within a range of 55 to 65, and more preferably, within a range of 55 to 62, by carrying out high frequency induction hardening with respect to the serrations 32 portion. In accordance with this feature, it is possible to more firmly join the inner ring 24 and the intervening member 18 by way of serration-fitting between the serrations 34 of the hole portion 28 and the serrations 32 of the tubular portion 30. Moreover, the above-described shaft portion 60 can also be constituted from the same material as that of the main body portion 62.

The rotational driving force transmission mechanism 10 according to the present embodiment is basically configured in the manner described above. Since the rotational driving force transmission mechanism 10 comprises the shaft 16 made of FRP, which is lighter than metal, it is possible to effectively reduce the weight in comparison with a case in which the rotational driving force transmission mechanism is equipped with a metal shaft (not shown).

Further, the intervening members 18, 20 are attached respectively to both ends of the shaft 16 in the axial direction. The inner ring 24 is externally fitted over the tubular portion 30 of the intervening member 18, whereby the first constant velocity joint 12 and the one end of the shaft 16 are joined via the intervening member 18. Similarly, the spider 44 is externally fitted over the tubular portion 30 of the intervening member 20, whereby the second constant velocity joint 14 and the other end of the shaft 16 are joined via the intervening member 20. Since the intervening members 18, 20 are made of metal, which is superior in terms of the ability to perform machining thereon, the tubular portions 30 can be easily and highly accurately machined to have a shape that can be firmly joined to the inner ring 24 or the spider 44.

In addition, in this case, it is possible to join the inner ring 24 and the spider 44 respectively to the tubular portions 30 of the intervening members 18, 20 utilizing, for example, existing equipment or the like for joining the inner ring 24 and the spider 44 to a solid shaft (not shown) made of metal. Accordingly, it is possible to reduce equipment costs for obtaining the rotational driving force transmission mechanism 10.

Furthermore, it is possible to firmly join the shaft 16, which is made of FRP, and the intervening members 18, 20, which are made of metal. As described above, in the intervening members 18, 20, the shaft portions 60 thereof are inserted into the shaft 16, and the tubular portions 30 are fitted over the shaft 16. Stated otherwise, the shaft portions 60 and the tubular portions 30 make it possible for the shaft 16 to be sandwiched from both the inner side and the outer side thereof in the radial direction. In addition, by fitting the inner ring 24 or the spider 44 onto the tubular portions 30, the state in which the tubular portions 30 are pressed toward the shaft portions 60 is maintained.

As a result, the bonding strength between the shaft 16 and the intervening members 18, 20 can be significantly increased, for example, more so than the bonding strength provided only by an adhesive. Further, unlike mechanical joining, it is possible to avoid the occurrence of damaged or severed portions in the reinforcing fibers of the shaft 16, and it is possible to prevent the weight of rivets (not shown) or the like from being added, and to avoid increasing the thickness of the shaft 16 and the intervening members 18, 20.

Thus, according to the rotational driving force transmission mechanism 10, it is possible to effectively reduce the weight thereof, while maintaining the torsional strength and the fatigue strength, which are sufficiently large for transmission of torque.

Further, in the rotational driving force transmission mechanism 10, as described above, since the shaft 16 is sandwiched between the shaft portion 60 and the tubular portion 30, for example, the torque transmitted from the spider 44 to the shaft 16 is transmitted to the inner ring 24 via both the shaft portion 60 and the tubular portion 30. At this time, distribution of torque to the shaft portion 60 and the tubular portion 30 can be arbitrarily set, for example, by adjusting the inner diameter d of the shaft 16, or the insertion length L of the shaft portion 60 with respect to the shaft 16. In this manner, since the degree of freedom in design can be enhanced, it is possible to provide the rotational driving force transmission mechanism 10 in accordance with required specifications.

Further, since the tubular portions 30 are press-fitted into the hole portions 28, 54, in particular, the side of the openings 76, which is thicker than the side of the bottom parts 72 of the tubular portions 30, is pressed toward the shaft 16 with a large pressing force, whereby the pressed state can be maintained. In accordance with this feature, the shaft 16 can be more firmly sandwiched between the tubular portions 30 and the shaft portions 60. As a result, it is possible to stably increase the bonding strength between both the inner ring 24 and the spider 44 and the tubular portions 30, as well as the bonding strength between the tubular portions 30 and the shaft portions 60.

As discussed above, even if the pressing force applied to the shaft 16 from the side of the openings 76 of the tubular portions 30 is increased, since the side of the bottom parts 72 is thinner than at the side of the openings 76, it is possible to easily insert the tubular portions 30 into the hole portions 28, 54. Accordingly, it is possible to avoid impairing the ability to assemble the rotational driving force transmission mechanism 10.

In the rotational driving force transmission mechanism 10, the intervening members 18, 20 are each formed by joining the shaft portion 60 and the main body portion 62. In this case, since the shaft portion 60 and the main body portion 62 can be formed separately, for example, it is possible to obtain the bottomed main body portion 62 at a low cost by adopting a plastic working process or the like. Further, for example, after having formed the protrusions 64 by a rolling process with respect to a rod-shaped material (not shown), then by cutting the material to a predetermined length and carrying out the above-described heat treatment thereon, the shaft portion 60 can be obtained in an efficient manner.

Further, according to the present embodiment, as described above, since the intervening members 18, 20 are constituted mutually in substantially the same manner, the intervening members 18, 20 can be formed by a common facility and process. Consequently, it is possible to increase manufacturing efficiency of the rotational driving force transmission mechanism 10, and to reduce manufacturing costs.

Moreover, in the case of joining the shaft 16 and the intervening members 18, 20 in order to obtain the rotational driving force transmission mechanism 10, it is preferable for the shaft portions 60 of the intervening members 18, 20 to be inserted into the shaft 16 in a state in which the shaft portions 60 thereof are cooled and shrunk at a temperature, for example, from −10 to −20° C. In this case, at the time of joining the intervening members 18, 20 and the shaft 16, it is possible to effectively avoid the occurrence of damaged or severed portions in the reinforcing fibers of the shaft 16.

The present invention is not particularly limited to the above-described embodiment, and various modifications may be adopted therein without departing from the essence and gist of the invention.

For example, in the above-described embodiment, the intervening member 18 and the intervening member 20 are constituted in the same manner. Further, the tubular portion 30 is made thicker on the side of the opening 76 than on the side of the bottom part 72. However, the present invention is not limited to this feature, and the constituent elements of the intervening members 18, 20 may be of various sizes and shapes, respectively and independently, in accordance with specifications of the vehicles or the like on which the rotational driving force transmission mechanism 10 is to be mounted.

In the above-described embodiment, the intervening members 18, 20 are formed by joining the shaft portion 60 and the main body portion 62, however, it is also possible to obtain the intervening members 18, 20 by integral molding.

In the rotational driving force transmission mechanism 10 according to the above-described embodiment, protrusions (not shown), which are similar to the protrusions 64 provided on the shaft portion 60, may also be provided on the inner circumference of the tubular portion 30. In this case, the bonding strength between the shaft 16 and the intervening members 18, 20 can be further enhanced.

What is claimed is:

1. A rotational driving force transmission mechanism, comprising a cylindrical shaft made of fiber reinforced plastic, and a constant velocity joint, wherein:
    the shaft is joined to the constant velocity joint via a metallic intervening member which is attached to at least one end of the shaft in an axial direction of the shaft;
    the intervening member includes a shaft portion configured to be inserted into the one end of the shaft from a distal end side thereof, and a main body portion of a bottomed tubular shape, made up from a bottom part joined to a proximal end side of the shaft portion, and a tubular portion configured to be fitted externally over the one end of the shaft;
    the tubular portion and the shaft portion extend toward the shaft from the bottom part;
    the one end of the shaft is sandwiched between the shaft portion and the tubular portion;
    the constant velocity joint includes an annular member fitted externally over the tubular portion of the intervening member;
    the tubular portion is sandwiched between the shaft and the annular member; and
    the shaft and the intervening member are fixed in a state that the shaft and the intervening member do not move relative to each other.

2. The rotational driving force transmission mechanism according to claim 1, wherein:
    protrusions extending along an axial direction of the shaft portion are disposed in plurality on an outer circumference of the shaft portion at intervals in a circumferential direction of the shaft portion, whereby ridges and valleys are arranged alternately in the circumferential direction; and on the shaft portion, an outer diameter of the ridges is greater than an inner diameter of the shaft, and an outer diameter of the valleys is less than the inner diameter of the shaft.

3. The rotational driving force transmission mechanism according to claim 1, wherein an adhesive layer is disposed between an outer circumferential surface of the shaft portion and an inner circumferential surface of the shaft.

4. The rotational driving force transmission mechanism according to claim 1, wherein an adhesive layer is disposed between an outer circumferential surface of the shaft and an inner circumferential surface of the tubular portion.

5. The rotational driving force transmission mechanism according to claim 1, wherein serrations configured to be fitted mutually together are formed on an outer circumference of the tubular portion and an inner circumference of the annular member.

6. The rotational driving force transmission mechanism according to claim 1, wherein the tubular portion is press-fitted into the annular member.

7. The rotational driving force transmission mechanism according to claim 1, wherein the tubular portion is thicker on a side of an opening than on a side of the bottom part.

* * * * *